US00RE47229E

(19) United States
(12) Reissued Patent
Nash-Putnam

(10) Patent Number: US RE47,229 E
(45) Date of Reissued Patent: Feb. 5, 2019

(54) METHOD, SYSTEM AND PROGRAM PRODUCT FOR BROADCAST OPERATIONS UTILIZING INTERNET PROTOCOL AND DIGITAL ARTIFACTS

(71) Applicant: Gula Consulting Limited Liability Company, Dover, DE (US)

(72) Inventor: Jon S. Nash-Putnam, Goodyear, AZ (US)

(73) Assignee: GULA CONSULTING LIMITED LIABILITY COMPANY, Wilmington, DE (US)

(21) Appl. No.: 15/442,447

(22) Filed: Feb. 24, 2017

Related U.S. Patent Documents

Reissue of:
(64) Patent No.: 8,966,517
Issued: Feb. 24, 2015
Appl. No.: 11/533,760
Filed: Sep. 20, 2006

U.S. Applications:
(60) Provisional application No. 60/718,846, filed on Sep. 20, 2005.

(51) Int. Cl.
*H04N 7/16* (2011.01)
*H04N 7/20* (2006.01)
(Continued)

(52) U.S. Cl.
CPC ..... *H04N 7/17309* (2013.01); *H04N 21/235* (2013.01); *H04N 21/23418* (2013.01);
(Continued)

(58) Field of Classification Search
CPC ..... H04N 7/17309; H04N 21/26603; H04N 21/6112; H04N 21/4782; H04N 21/4622;
(Continued)

(56) References Cited

U.S. PATENT DOCUMENTS 4,025,851 A 5/1977 Haselwood et al.
4,457,804 A 7/1984 Reinhall
(Continued)

FOREIGN PATENT DOCUMENTS

EP 0 859 503 A3 2/1997
EP 0 899 688 A2 3/1999
(Continued)

OTHER PUBLICATIONS

Denham, S.L., "A Model of Temporal Response Properties in Primary Auditory Cortex," 2000, 13 pages.
(Continued)

*Primary Examiner* — Joshua D Campbell
(74) *Attorney, Agent, or Firm* — Christensen O'Connor Johnson Kindness PLLC

(57) ABSTRACT

An affiliate site commands the central site to construct a unique broadcast event log through the affiliate site's command browser. The sequenced data stream of broadcast content is combined with a digital artifact inserted into the digitized broadcast video and/or audio content immediately prior to the data transmission process. Transmission to the affiliate site is accomplished utilizing Internet Protocol. Upon reception at the destination, the commercial advertising or prepared program content is input to the affiliate site's system, routed to the broadcast production system, and in turn, processed by the broadcast transmission site, where it is converted from a digital to an analog signal, and transmitted electromagnetically in the radio frequency spectrum by the broadcast transmitter.

26 Claims, 7 Drawing Sheets

(51) Int. Cl.

| | |
|---|---|
| ***H04N 7/173*** | (2011.01) |
| ***H04N 21/234*** | (2011.01) |
| ***H04N 21/235*** | (2011.01) |
| ***H04N 21/2543*** | (2011.01) |
| ***H04N 21/81*** | (2011.01) |
| ***H04N 21/435*** | (2011.01) |
| ***H04N 21/462*** | (2011.01) |
| ***H04N 21/4782*** | (2011.01) |
| ***H04N 21/61*** | (2011.01) |
| ***H04N 21/266*** | (2011.01) |

(52) U.S. Cl.
CPC ... *H04N 21/23424* (2013.01); *H04N 21/2543* (2013.01); *H04N 21/26603* (2013.01); *H04N 21/435* (2013.01); *H04N 21/4622* (2013.01); *H04N 21/4782* (2013.01); *H04N 21/6112* (2013.01); *H04N 21/812* (2013.01)

(58) Field of Classification Search
CPC ..... H04N 21/23418; H04N 21/812; H04N 21/2543; H04N 21/235; H04N 21/23424; H04N 21/435
USPC ..... 725/22, 116, 119, 146, 149
See application file for complete search history.

(56) References Cited

U.S. PATENT DOCUMENTS

| | | | | |
|---|---|---|---|---|
| 4,497,060 | A | 1/1985 | Yang | |
| 4,639,779 | A | 1/1987 | Greenburg | |
| 4,805,020 | A | 2/1989 | Greenburg | |
| 4,876,617 | A | 10/1989 | Best et al. | |
| 5,019,899 | A | 5/1991 | Boles et al. | |
| 5,113,437 | A | 5/1992 | Best et al. | |
| 5,128,933 | A | 7/1992 | Baranoff-Rossine | |
| 5,319,735 | A | 6/1994 | Preuss et al. | |
| 5,379,345 | A | 1/1995 | Greenburg | |
| 5,450,122 | A | 9/1995 | Keene | |
| 5,450,490 | A | 9/1995 | Jensen et al. | |
| 5,584,050 | A * | 12/1996 | Lyons | 455/2.01 |
| 5,600,573 | A * | 2/1997 | Hendricks et al. | 725/109 |
| 5,613,004 | A | 3/1997 | Cooperman et al. | |
| 5,636,292 | A | 6/1997 | Rhoads | |
| 5,659,350 | A * | 8/1997 | Hendricks et al. | 725/116 |
| 5,663,766 | A | 9/1997 | Sizer, II | |
| 5,687,236 | A | 11/1997 | Moskowitz et al. | |
| 5,737,025 | A | 4/1998 | Dougherty et al. | |
| 5,828,270 | A | 10/1998 | Chang | |
| 5,850,481 | A | 12/1998 | Rhoads | |
| 5,872,588 | A | 2/1999 | Aras et al. | |
| 5,889,868 | A | 3/1999 | Moskowitz et al. | |
| 5,905,800 | A | 5/1999 | Moskowitz et al. | |
| 5,940,135 | A | 8/1999 | Petrovic et al. | |
| 6,026,193 | A | 2/2000 | Rhoads | |
| 6,035,177 | A | 3/2000 | Moses et al. | |
| 6,047,374 | A | 4/2000 | Barton | |
| 6,101,604 | A | 8/2000 | Barton | |
| 6,163,842 | A | 12/2000 | Barton | |
| 6,173,271 | B1 * | 1/2001 | Goodman et al. | 705/40 |
| 6,205,249 | B1 | 3/2001 | Moskowitz | |
| 6,216,228 | B1 | 4/2001 | Chapman et al. | |
| 6,285,774 | B1 | 9/2001 | Schumann et al. | |
| 6,588,013 | B1 * | 7/2003 | Lumley et al. | 725/32 |
| 6,604,224 | B1 | 8/2003 | Armstrong et al. | |
| 6,625,295 | B1 | 9/2003 | Wolfgang et al. | |
| 6,718,551 | B1 | 4/2004 | Swix et al. | |
| 6,721,437 | B1 | 4/2004 | Ezaki et al. | |
| 6,769,127 | B1 * | 7/2004 | Bonomi et al. | 725/39 |
| 7,039,931 | B2 | 5/2006 | Whymark | |
| 7,124,442 | B2 | 10/2006 | Nash-Putnam | |
| 7,194,757 | B1 * | 3/2007 | Fish et al. | 725/121 |
| 2002/0059633 | A1 * | 5/2002 | Harkness et al. | 725/108 |
| 2002/0076043 | A1 | 6/2002 | Van Der Vleuten et al. | |
| 2002/0083442 | A1 | 6/2002 | Eldering | |
| 2002/0178445 | A1 | 11/2002 | Eldering et al. | |
| 2002/0184091 | A1 * | 12/2002 | Pudar | G06Q 30/02 705/14.62 |
| 2003/0005437 | A1 * | 1/2003 | Feuer et al. | 725/34 |
| 2003/0115591 | A1 * | 6/2003 | Weissmueller et al. | 725/22 |
| 2004/0015400 | A1 * | 1/2004 | Whymark | 705/14 |
| 2004/0025176 | A1 | 2/2004 | Franklin et al. | |
| 2004/0054589 | A1 * | 3/2004 | Nicholas | G06Q 30/02 705/14.52 |
| 2005/0166237 | A1 * | 7/2005 | Kawakami | 725/50 |
| 2007/0130581 | A1 * | 6/2007 | Del Sesto et al. | 725/36 |
| 2012/0030704 | A1 * | 2/2012 | Schiller et al. | 725/34 |

FOREIGN PATENT DOCUMENTS

| | | | |
|---|---|---|---|
| EP | 1 031 944 | A1 | 8/2000 |
| EP | 1 063 833 | A2 | 12/2000 |
| EP | 1 075 108 | A1 | 2/2001 |
| EP | 1 079 627 | A1 | 2/2001 |
| WO | 00/25203 | A1 | 5/2000 |
| WO | WO 00/25203 | | 5/2000 |
| WO | 00/54453 | A1 | 9/2000 |
| WO | WO 00/54453 | | 9/2000 |
| WO | 01/22652 | A2 | 3/2001 |
| WO | WO/01/22652 | A2 | 3/2001 |
| WO | 01/45316 | A1 | 6/2001 |
| WO | 01/45410 | A2 | 6/2001 |
| WO | WO 01/45316 | A1 | 6/2001 |
| WO | WO 01/45410 | A2 | 6/2001 |

OTHER PUBLICATIONS

Gockel, H., et al., "Louder Sounds Can Produce Less Forward Masking: Effects of Component Phase in Complex Tones," Journal of the Acoustical Society of America 114:978-990, Aug. 2003.
Office Action dated Dec. 2, 2008, from U.S. Appl. No. 11/533,748, filed Sep. 20, 2006, 24 pages.
Final Office Action dated Sep. 3, 2009, from U.S. Appl. No. 11/533,748, filed Sep. 20, 2006, 30 pages.
Office Action dated May 26, 2011, from U.S. Appl. No. 11/533,748, filed Sep. 20, 2006, 29 pages.
Final Office Action dated Nov. 21, 2011, from U.S. Appl. No. 11/533,748, filed Sep. 20, 2006, 22 pages.
Notice of Allowance dated Jun. 14, 2013, from U.S. Appl. No. 11/533,748, filed Sep. 20, 2006, 9 pages.
Supplemental Notice of Allowance dated Sep. 24, 2013, from U.S. Appl. No. 11/533,748, filed Sep. 20, 2006, 4 pages.
Office Action dated Dec. 4, 2008, from U.S. Appl. No. 11/533,754, filed Sep. 20, 2006, 17 pages.
Final Office Action dated Sep. 15, 2009, from U.S. Appl. No. 11/533,754, filed Sep. 20, 2006, 20 pages.
Office Action dated Jun. 7, 2011, from U.S. Appl. No. 11/533,754, filed Sep. 20, 2006, 21 pages.
Final Office Action dated Nov. 21, 2011, from U.S. Appl. No. 11/533,754, filed Sep. 20, 2006, 21 pages.
Notice of Allowance dated Jun. 24, 2013, from U.S. Appl. No. 11/533,754, filed Sep. 20, 2006, 10 pages.
Supplemental Notice of Allowance dated Sep. 26, 2013, from U.S. Appl. No. 11/533,754, filed Sep. 20, 2006, 4 pages.
Office Action dated Jan. 26, 2009, from U.S. Appl. No. 11/533,760, filed Sep. 20, 2006, 10 pages.
Final Office Action dated Nov. 13, 2009, from U.S. Appl. No. 11/533,760, filed Sep. 20, 2006, 10 pages.
Office Action dated Mar. 17, 2011, from U.S. Appl. No. 11/533,760, filed Sep. 20, 2006, 12 pages.
Office Action dated Nov. 7, 2011, from U.S. Appl. No. 11/533,760, filed Sep. 20, 2006, 11 pages.
Final Office Action dated Jan. 3, 2013, from U.S. Appl. No. 11/533,760, filed Sep. 20, 2006, 12 pages.
Office Action dated Jul. 18, 2013, from U.S. Appl. No. 11/533,760, filed Sep. 20, 2006, 14 pages.
Final Office Action dated Jan. 30, 2014, from U.S. Appl. No. 11/533,760, filed Sep. 20, 2006, 16 pages.

(56) References Cited

OTHER PUBLICATIONS

Notice of Allowance dated Oct. 16, 2014, from U.S. Appl. No. 11/533,760, filed Sep. 20, 2006, 20 pages.
International Preliminary Report on Patentability dated Mar. 26, 2008, issued in International Application No. PCT/US2006/36663, filed Sep. 20, 2006, 7 pages.
Extended European Search Report dated May 15, 2012, issued in EP Application No. 06803922, filed Sep. 20, 2006, 7 pages.
Kim, H.J., et al., "Audio Watermarking Techniques," in J.-S. Pan et al. (eds.) "Intelligent Watermarking Techniques," World Scientific, Feb. 2004, pp. 185-217.
Putnam, Method, System and Program Product for the Insertion and Retrieval of Identifying Artifacts in Transmitted Lossy and Lossless Data, PCT Notification of Transmittal of the International Search Report and The Written Opinion of the International Searching Authority, or the Declaration, Aug. 7, 2007, PCT/US06/36663, CeloData, Inc.
Zeng, Fan-Gang, Interactions of Forward Masking and Simultaneous Masking in Intensity Discrimination. Journal of Acoustic Society of America, 1998, vol. 103, pp. 2021-2030.
Wehr, Michael and Zador, A.M., Synaptic Mechanisms of Forward Suppression in Rat Auditory Cortex, Neuron, 2005, vol. 47, pp. 473-445.
Meddis, Ray and O'Mard, L.P., Computer Model of the Auditory-Nerve Response to Forward Masking Stimuli, Journal of Acoustic Society America, 2005, vol. 117, pp. 3788-3798.
Jones, E.G., Viewpoint: The core and Matrix of Thalamic Organization, Neuroscience, 1998 vol. 85, pp. 331-345.
Heinz, Michael G., Colburn, H.S., and Carney, L.H., Quantifying the Implications of Non-linear Tuning for Auditory-Filter Estimates. Journal of Acoustic Society of America, 2002, vol. 111, pp. 978-990.
Gockel, Hedwig, et al. Louder Sounds Can Produce Less Forward Masking: Effects of Component Phase in Complex Tones, Journal of Acoustic Society of America, 2003 vol. 114, pp. 114,978-990.
Denham, Susan L., A Model of Temporal Response Properties in Primary Auditory Cortex, 2001.
Corbo, Nicholas T.—Office Action dated Dec. 2, 2008; U.S. Appl. No. 11/533,748.
Corbo, Nicholas T.—Office Action dated Sep. 3, 2009; U.S. Appl. No. 11/533,748.
Corbo, Nicholas T.—Office Action dated Dec. 4, 2008; U.S. Appl. No. 11/533,754.
Corbo, Nicholas T.—Office Action dated Sep. 15, 2009; U.S. Appl. No. 11/533,754.

* cited by examiner

METHOD, SYSTEM AND PROGRAM PRODUCT FOR BROADCAST OPERATIONS UTILIZING INTERNET PROTOCOL AND DIGITAL ARTIFACTS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

PRIORITY CLAIM

[The] *This* application *is a reissue of U.S. Pat. No. 8,966,517, issued Feb. 24, 2015, which* claims the benefit of priority under 35 U.S.C. § 119(e) from U.S. Provisional Application No. 60/718,846, entitled, "[A] System and Method for Broadcast Operations Utilizing Internet Protocol and Digital Artifacts," filed on Sep. 20, 2005, *all of* which [is] *are* incorporated herein by reference in [its] *their* entirety.

CROSS-REFERENCE TO RELATED APPLICATIONS

The present application is related to the following [copending] U.S. patent applications filed on [even date herewith] *Sep. 20, 2006*, owned by the assignee hereof, and which are hereby incorporated herein by reference in their entirety:

U.S. Pat. No. 7,668,205, *issued Feb. 23, 2010,* entitled "Method, System and Program Product for the Insertion and Retrieval of Identifying Artifacts in Transmitted Lossy and Lossless Data."

[Application] *U.S. patent application* Ser. No. 11/533,748, *now U.S. Pat. No. 8,566,857, issued Oct. 22, 2013,* entitled "Method, System and Program Product for Broadcast Advertising and Other Broadcast Content Performance Verification Utilizing Digital Artifacts."

[Application] *U.S. patent application* Ser. No. 11/533,754, *now U.S. Pat. No. 8,566,858, issued Oct. 22, 2013,* entitled "Method, System and Program Product for Broadcast Error Protection of Content Elements Utilizing Digital Artifacts."

BACKGROUND

It is desirable to transmit program and commercial content to radio and television broadcasters over standard communications channels. Prior to Internet transmission methods, this process was accomplished by one-way audio or audio/video transmission methods using a variety of techniques. Principal among these are 1) analog and digital telephone networks based on copper wire, coaxial cable, fiber optics, or microwave transmission, or 2) satellite point-to-point transmission. Such transmissions may be used to convey radio and television programs, radio and television commercials, broadcast news programming, sports programming, and special events.

Existing radio and television broadcast network technology has heretofore been limited to a one-to-many distribution paradigm. In their earliest form these networks were comprised of dedicated telephone lines that interconnected network origination points to individual radio, and later television stations. These were later replaced by coaxial cable networks and later microwave relay links. More recently, analog and digital satellite distribution technologies have been employed. These methodologies are unidirectional and have no internal capability for bidirectional operation.

Satellite distribution methodologies are dominated by protocols designed specifically for the dissemination of digitized audio and video signals unidirectionally. This method is designed for one-to-many distribution as are the older telephone coaxial cable and microwave approaches, which are not cost efficient for single point or one-to-one applications.

Although approaches such as those described above are typically sufficient for the particular purposes for which they were designed, they suffer certain deficiencies when viewed from the perspective of unitary, customized or virtual broadcast network applications. What is needed is a communications system that enables the simultaneous bi-directional transmission of data streams of voice, music, video and/or audio content in one-to-one broadcast applications.

SUMMARY

In accordance with representative embodiments of the present disclosure, methods, systems and program products to create, organize, control, and distribute the simultaneous bi-directional transmission of data streams of voice, music, video, and/or audio content via an Internet Protocol based communications system are disclosed. In a representative embodiment of the present disclosure, a central system of networked computers containing, for example, a number of individual items of broadcast content, performance instructions in the form of broadcast event logs, and interconnections to other sources of traditional radio and/or television networks and other syndicated broadcast content is in communication via satellite or data communications network with any number of computer systems located at affiliate stations. The communication protocol utilized to establish and maintain a client/server relationship is the Internet Protocol.

The affiliate site's client computer system commands the central server systems to construct a unique broadcast event log. Either immediately or at a later time, the affiliate site's client system commands the central server to execute the instructions contained in the log. The central server assembles a sequence of stored audio and/or video segments and optionally intersperses them with data streams created from traditional network or other syndicated program and commercial content for transmission to the affiliate client system.

The sequenced data stream of broadcast content is combined with a digital artifact inserted into the digitized broadcast video and/or audio content immediately prior to the data transmission process. Transmission to the destination is accomplished by any data communications channel utilizing Internet Protocol. Upon reception at the destination, the data signal is input into the affiliate site's client system, routed to the broadcast production system, and in turn, processed by the broadcast transmission site, where it is converted from a digital to an analog signal, and transmitted electromagnetically in the radio frequency spectrum by the broadcast transmitter.

Content distribution from the central site to the affiliate sites is accomplished in three distinct processes; 1) Network or syndicated originations, 2) Stored content and 3) Live or affiliate originations.

Traditional broadcast networks and program syndicates using any representative embodiment of the present disclosure to distribute content and receive proof of performance, route event content and data to the central site. These traditional network and/or syndicated content and event data records are received at the central site from radio and/or television networks, or program syndicates through digital or analog satellite transmission, data communications network, or Internet Protocol-based data streams. The data event records from these sources' automated scheduling or traffic systems are assigned a unique event number and stored in the central site event log database.

Independent program and commercial content is received from advertisers or program producers or program syndicates for storage in the central site program and commercial databases for future broadcast by radio and/or television stations through their affiliate site infrastructure. These broadcast events are available for access by the affiliate sites by scheduling these events for broadcast through the affiliate site's command browser. The event data records with pertinent and related information about the program or commercial content are assigned an unique event number and stored in the central site event log database by a special function server dedicated to that process.

Similarly, affiliates may upload commercial advertising or prepared program content for insertion into the affiliate site's private commercial content database or program content database for future use as a sequenced broadcast event. The affiliate sites, utilizing an Internet software browser synchronized with digital audio production software and raw audio and/or video sources assembles unique broadcast program content. This completed content, such as a commercial announcement, is then uploaded to the central server using the Internet Protocol through an appropriate communication network. The content from the affiliate is received at the central server and is stored in a private data storage area of the central site's program content and/or commercial content database for subsequent use upon command from the affiliate site's command browser. Live voice announcements may be similarly processed and inserted in the broadcast sequence using this method. The event data record from the affiliate site's traffic system related to either the commercial or the program content is assigned a unique event number and stored in the event log database.

All objects, features, and advantages of the present disclosure will become apparent in the following detailed written description.

BRIEF DESCRIPTION OF THE DRAWINGS

In the following detailed description of representative embodiments of the disclosure, reference is made to the accompanying drawings, which form a part hereof, and in which is shown by way of illustration specific representative embodiments in which the disclosure may be practiced, as follows.

In the accompanying drawings, in which like numbers represent the same or similar elements and one or a plurality of such elements, features might not be to scale and may be shown in generalized or schematic form or may be identified solely by name or other commercial designation.

DETAILED DESCRIPTION OF PREFERRED EMBODIMENTS

In the following detailed description of representative embodiments of the disclosure, specific representative embodiments in which the disclosure may be practiced are described in sufficient detail to enable those skilled in the art to practice the disclosure, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined only by the appended claims. In particular, although the illustrated embodiment is described below with primary respect to a radio broadcast system, it will be appreciated that the present disclosure is not limited to such implementations, and may be implemented in radio, television, Internet, cellular, Wi-Fi, Wi-MAX, satellite, local area network, wide area network, a public switched telephone network, a wireless network, fiber-optic network, microwave transmission link, and other broadcast systems.

Figure 1:
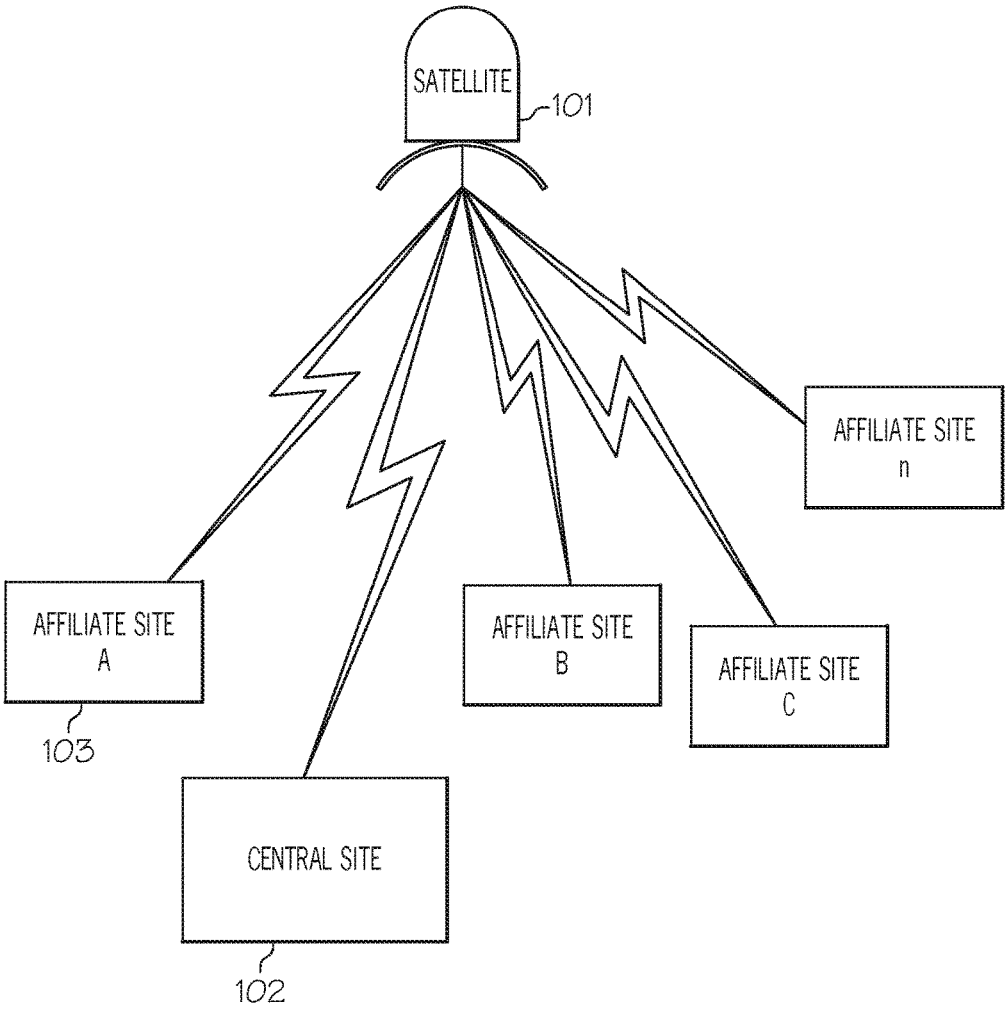
FIG. 1 is a diagram of a satellite system for broadcast operations using the Internet Protocol in accordance with a representative embodiment of the present disclosure.

FIG. 1 is a diagram of a system 100 for broadcast operations using the Internet Protocol and digital artifacts in accordance with a representative embodiment of the present disclosure. System 100 performs real-time command, selection, assembly, aggregation, and automated insertion of digital artifact data with a broadcast data stream. Further, the system 100 causes the transmission of a broadcast data stream by satellite transmission or any other data communications network to an affiliate location for the real-time processing of the broadcast data stream into a broadcast transmission in the radio frequency spectrum.

System 100 includes a central site infrastructure (102) which is a network of computer systems that receive commercial advertising, promotional announcements, station identifications, public service announcements, programs, and data input from traditional radio and/or television networks, advertisers, advertising agencies, media buying services, program producers, and program syndicates. The central site (102) acts as a repository for stored advertising and program content and receives real-time announcements, commercial advertising content, program content, and data input from affiliates station sites (103) by the means of communications satellite transmission, or the Internet, a local area network, a wide area network, the public switched telephone network, a wireless network, fiber-optic network, other suitable communications media, or a suitable combination of such communications media (101).

Individual events are sequenced for distribution to the affiliate by commands transmitted to the central site infrastructure (102) by an Internet browser resident at, and/or controlled by, the affiliate site. A sequenced broadcast event data stream created on command at the central site (102) contains hidden, embedded identification codes for performance verification. The broadcast event data streams are called carriers; the continuous, embedded identification codes are called a digital artifact; and integration of the carrier and the digital artifact is called a composite data stream.

Figure 2:
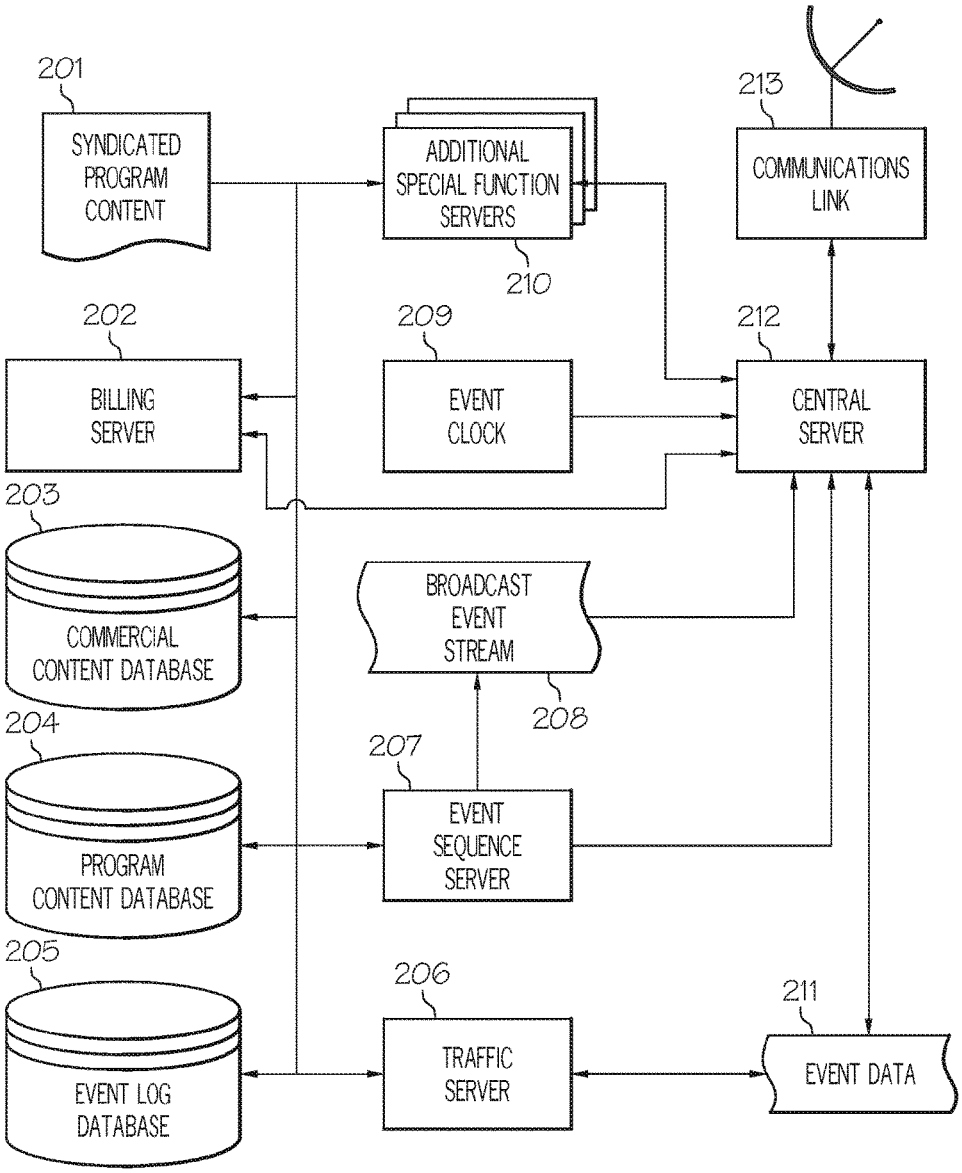
FIG. 2 is a diagram of representative components of a central site system for broadcast operations using the Internet Protocol in accordance with a representative embodiment of the present disclosure.

FIG. 2 is a diagram of the central site infrastructure (102) which is comprised of a number of computers functioning as servers performing specified processes and coupled together in a network. As used herein, the term "couple," and its cognate terms such as "couples" and "coupled," can include a physical connection (such as through one or more copper conductors), a optical connection (such as one or more fiber optic conductors), a logical connection (such as through one or more logical devices of a semi-conducting circuit), a wireless connection, a hypertext transfer protocol (HTTP) connection, other suitable connections, or a suitable combination of such connections.

The central site infrastructure (102) components are coupled to a central server (212) which controls, organizes, and administers requests transmitted from affiliate station sites and forwards the requested broadcast event data streams when the streams have been retrieved, processed, and assembled into a data stream. Central server (212) also controls the dissemination of billing instructions by other computers acting as special function servers within the central site infrastructure (102).

The traffic server (206) which is coupled to the central server (212) functions as a file server for all information records related to the broadcast of events stored within the central infrastructure (102) or accessible from external traditional radio or television broadcast networks or syndicated sources through the Internet, a local area network, a wide area network, the public switched telephone network, a wireless network, fiber-optic network, other suitable communications media, or a suitable combination of such communications media. In turn, the traffic server (206) is coupled with, but not limited in its couplings to, an event log database (205), a program content database (204), a commercial content database (203), external, traditional broadcast networks and syndicated program content sources (201), and two other special function servers dedicated to organizing the broadcast event sequences and to affiliate billing for the central services.

The event sequence server (207) which is coupled to a central server (212) functions as a file server for all broadcast content digital audio files stored within the central infrastructure (102) and the data streams from traditional radio and television broadcast networks or syndicated program content producers accessible through the Internet, a local area network, a wide area network, the public switched telephone network, a wireless network, fiber-optic network, other suitable communications media, or a suitable combination of such communications media. In turn, the event sequence server (207) is coupled with, but not limited in its couplings to, an event log database (205), a program content database (204), a commercial content database (203), external, traditional broadcast networks and syndicated program content sources (201), and two other special function servers dedicated to the administration of program and commercial event sequences and to affiliate billing for the central services.

The billing server (202) which is coupled to the central server (212), and is also coupled with the traffic server (206), and other special function servers (210) in the central infrastructure (102) through the Internet, a local area network, a wide area network, the public switched telephone network, a wireless network, fiber-optic network, other suitable communications media, or a suitable combination of such communications media. Its function is to account for all broadcast event transactions requested by the station affiliate sites and processed through the central site infrastructure.

A central event clock (209) is coupled to the central server (212) and through the internal network it provides synchronizing time pulses and time code to the central server and the other special function servers in the central site infrastructure (102). Its primary function is to supply time pulses or codes to the central server (212), which are integral to the creation of the hidden, embedded digital artifact in the composite data stream.

A communication link (213) is coupled to the central server (212), and couples the central site infrastructure (102) to the affiliate sites (103) through the Internet, a local area network, a wide area network, the public switched telephone network, a wireless network, fiber-optic network, other suitable communications media, or a suitable combination of such communications media.

Figure 3:
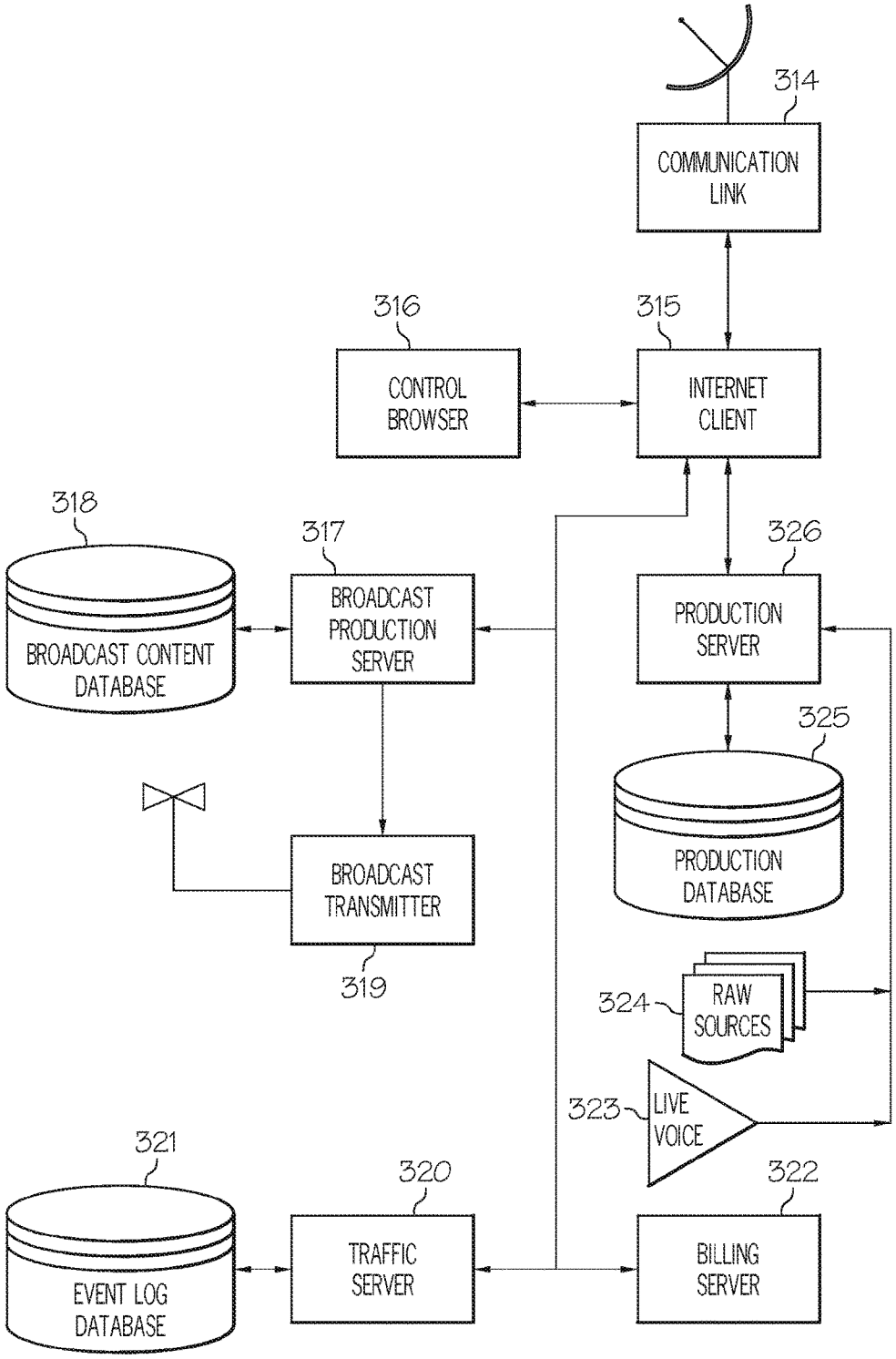
FIG. 3 is a diagram of representative components of an affiliate site system for broadcast operations using the Internet Protocol in accordance with a representative embodiment of the present disclosure.

FIG. 3 is a diagram of the radio or television station affiliate site infrastructure (103) which is comprised of a number of computers functioning as servers performing specified processes and coupled together in a network.

The affiliate site infrastructure (103) components are coupled to a computer, which functions as an Internet client (315). A control browser (316) resident on this computer and which is accessible through the internal network from the other special function servers (210) of the affiliate site infrastructure (103) issues requests and commands to the control server (212) at the central site (102).

Four special function servers are coupled within the affiliate site infrastructure (103) to the Internet client (315). These computers performs all functions required to receive the broadcast event data stream, route the data stream to the affiliate broadcast transmitter site (319), convert the data stream into an analog audio or audio and video signals for transmission electromagnetically in the radio frequency spectrum, maintain accurate records of the broadcast events transmitted, produce new broadcast content for transmission to the central site, and provide accounting information for advertiser billing.

The broadcast production server (317), which is coupled to the Internet client (315), is also coupled with three other special function servers in the affiliate infrastructure (103) through the Internet, a local area network, a wide area network, the public switched telephone network, a wireless network, fiber-optic network, other suitable communications media, or a suitable combination of such communications media. The function of the broadcast production server (317) is to process the broadcast event stream received from the central site (102) through the Internet client (315) and integrates it with other content and digital artifacts initiated in the affiliate site (103). Further, the broadcast production server (317) routes the integrated data stream to the broadcast transmitter (319) as an analog signal for broadcast by the broadcast transmitter (319) in the radio frequency spectrum. The broadcast production server (317) is also coupled to the affiliate site production server (326), traffic server (320), and billing server (322). The couplings assure that external sources of content can be integrated into the broadcast event stream, that the sequence of broadcast events broadcast comply with advertising insertion orders, contract terms and conditions, and that the affiliate has recorded sufficient information to produce an invoice to the advertiser for the broadcast of advertisements.

The traffic server (320), which is coupled with the Internet client (315), is also coupled with three other special function servers in the affiliate infrastructure through the Internet, a local area network, a wide area network, the public switched telephone network, a wireless network, fiber-optic network, other suitable communications media, or a suitable combination of such communications media. The traffic server (320) is also coupled to the affiliate site production server (326), broadcast production server (317) and billing server (322). Its function is to process the advertisement performance instructions contained in the advertisement insertion order and to record the actual performance of the advertisement as it is integrated into the broadcast data stream by the broadcast production server. Its further function is to communicate this record to the billing server (322).

The billing server (322) which is coupled to the Internet client (315) is also coupled through it in the affiliate site network to the three other special function servers through the Internet, a local area network, a wide area network, the public switched telephone network, a wireless network, fiber-optic network, other suitable communications media, or a suitable combination of such communications media. The billing server (322) is also coupled to the affiliate site production server (326), broadcast production server (317) and traffic server (320). Its function is to convert the advertisement event record maintained in the affiliate site's event log database (321) by the affiliate traffic server (320) into advertiser invoices and other appropriate accounting and financial management reports.

The affiliate site production server (326) is also coupled by the Internet client (315) in the affiliate site network to three other special function servers through the Internet, a local area network, a wide area network, the public switched telephone network, a wireless network, fiber-optic network, other suitable communications media, or a suitable combination of such communications media. The production server (326) is also coupled to the affiliate site broadcast production server (317), traffic server (320), and billing server (322). The function of the production server (326) is to control the preparation of new program content and/or new broadcast content through the integration of digital audio or digitized analog audio sources. Raw sources (324) include, but are not limited to, compact disc (CD) players and player/recorders, digital audio tape (DAT) players and player/recorders, analog audio tape, cassette, or cartridge players or player/recorders, and electro-transcription disc players. Live voice (323) sources captured by microphone or other digital direct capture device may also be integrated by the production server (326).

The communication link (314) couples the Internet client (315) to the central site infrastructure (102) through the Internet, a local area network, a wide area network, satellite the public switched telephone network, a wireless network, fiber-optic network, other suitable communications media, or a suitable combination of such communications media.

Figure 4:
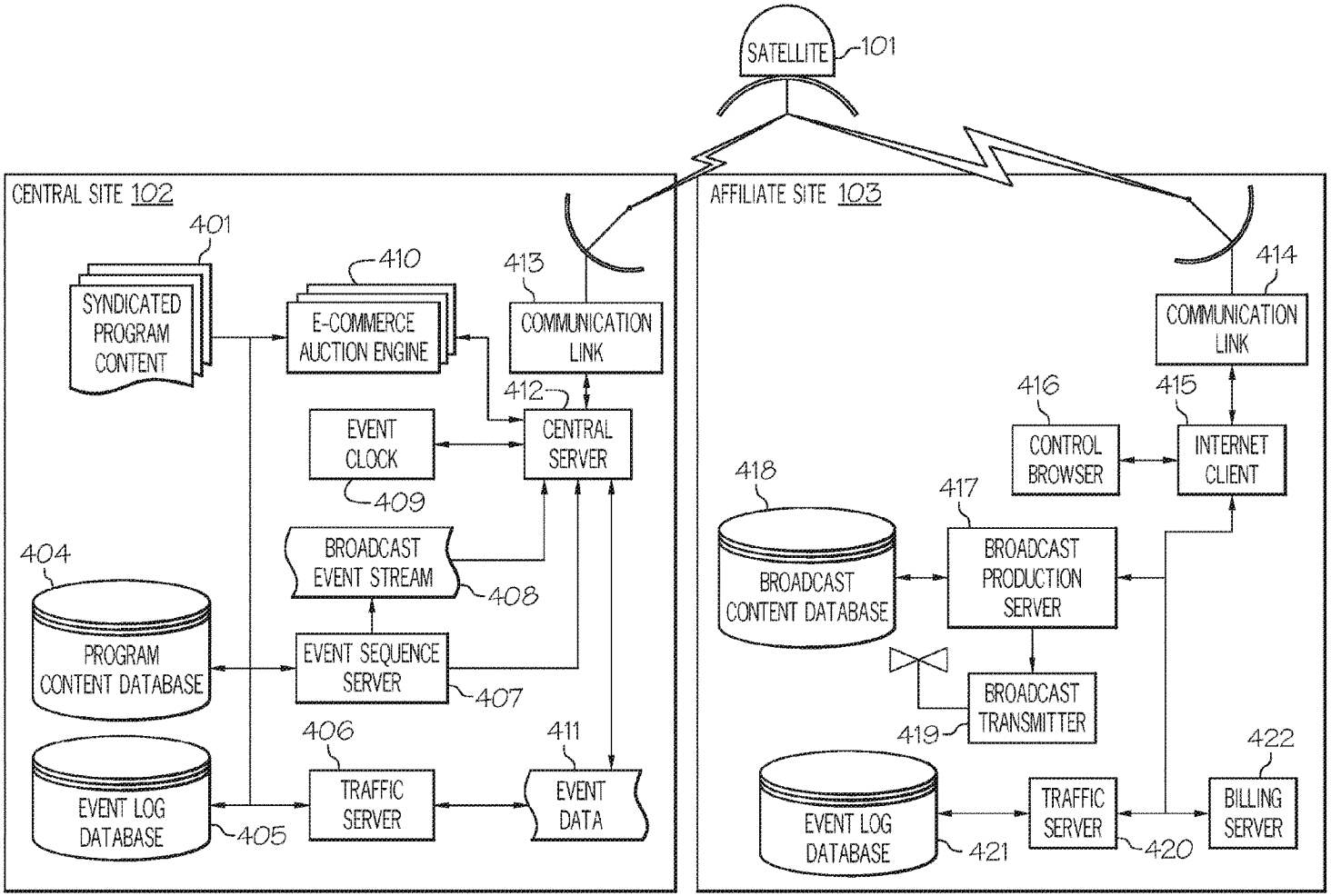
FIG. 4 is a data flow diagram of representative interactions between the central site system and the affiliate site system during traditional network or syndicated programming originations in accordance with a representative embodiment of the present disclosure.

FIG. 4 is a data flow diagram of representative interactions between the central and affiliate site system during network or syndicated programming originations in accordance with a representative embodiment of the present disclosure. The flow of the process for network or syndicated programming originations begins in the affiliate site system (103). It passes through communication links, such as a communication satellite (101), to the central site system (102), where the program, commercial, and event files are accessed, sequenced, and executed. The broadcast event data stream is forwarded through communication links, such as a communication satellite (101), to the affiliate site (103) for broadcast.

Syndicated or traditional radio and/or television network program content is received at the central site (102) and is either routed in real-time to the event sequence server (407) for distribution to the requesting affiliate site (103) or is stored for future broadcast in the central site program content database (404). Accompanying the data stream containing the syndicated or traditional radio and/or television network program content, are two data items; (1) the event record of information describing the contents of the data stream, and (2) destination instructions designating the affiliate sites (103) that are targets of distribution.

Prior to the broadcast date and time, a command is issued by the affiliate site control browser (416) requesting the scheduling of the traditional network program content or syndicated program content for broadcast from the affiliate site (103). If the time schedule of the request is other than the scheduled time in real-time, the network program or syndicated program content is stored by the event sequence server in the program content database (404).

In the case of real-time distribution, the traditional radio and/or television network program content or syndicated program content (401) is input to the event sequence server (407). The event sequence server (407) assembles the broadcast event sequence as instructed by the affiliate control browser (416), and the content is converted into a compressed data stream. The data stream is forwarded to the central server (412) for the integration of the digital artifact. The event data (411) containing the unique event identification code and the destination instructions is drawn from the event log database (405) by the traffic server (406) and presented to the central server (412), a unique time stamp is drawn from the event clock (409) and is combined with the event data (411) and the central server's own source identifier to form the digital artifact. The digital artifact is then imbedded steganographically into the broadcast event data stream and the data stream is transmitted to the affiliate site (103) by the communication link (413) through the Internet, a local area network, a wide area network, the public switched telephone network, a wireless network, fiber-optic network, other suitable communications media, or a suitable combination of such communications media. On the basis of command instructions from the affiliate control browser (416), the compressed data stream is routed by the Internet client (415) to the affiliate broadcast production server (417).

The broadcast event sequence data stream containing the real-time traditional radio and/or television network content or syndicated content is passed to the affiliate site's broadcast production server (417) for insertion into the affiliate's broadcast event sequence and the resulting integrated broadcast event sequence assembled from digital audio files stored in the affiliate site's broadcast content database (418) is routed to the affiliate site's broadcast transmitter (419). At the broadcast transmitter (419), the affiliate broadcast event stream is passed through a digital-to-analog converter where the data stream is translated into a broadcast standard audio or audio/video signal. The signal including the digital artifact is then routed through the broadcast transmitter's program feed signal processing where it is limited for dynamic amplitude, compressed for frequency response, and routed to the transmitter for broadcast electromagnetically in the radio frequency spectrum.

The traditional network program or syndicated program event data records are accessed from the central site event log database (405) by the traffic server (406) and routed to the central server (412) for distribution to the designated affiliate site (103) by the central site communication link (413) through the Internet, a local area network, a wide area network, the public switched telephone network, a wireless network, fiber-optic network, other suitable communications media, or a suitable combination of such communications media to the affiliate site communication link (414). The affiliate site Internet client (415) routes the event records to the affiliate site's traffic server (420). The traditional network program event records or syndicated program event records are integrated with the other traffic records of the advertiser and are routed on requests from the billing server (422).

Figure 5:
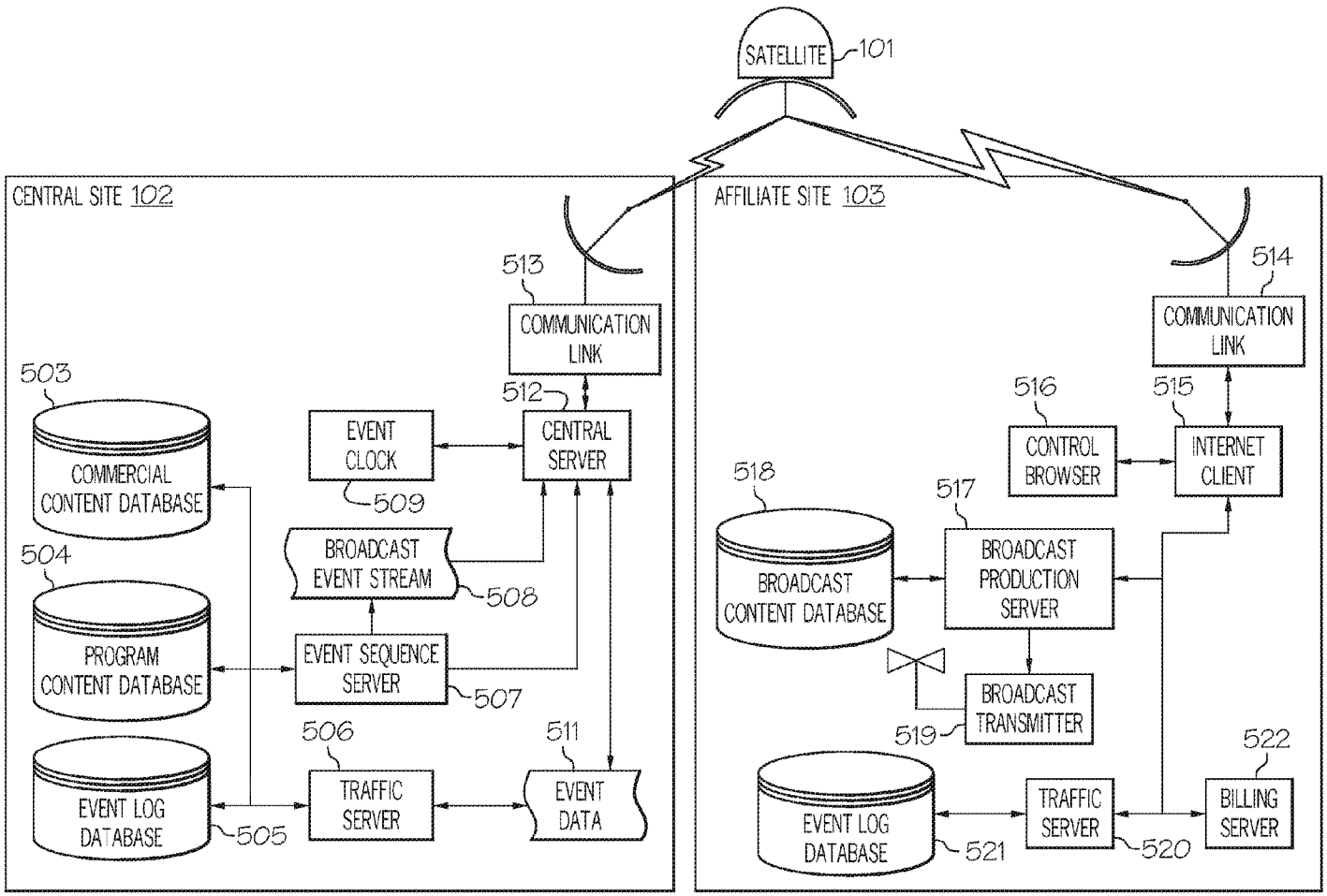
FIG. 5 is a data flow diagram of representative interactions between the central site system and the affiliate site systems during affiliate controlled, centrally stored content originations in accordance with a representative embodiment of the present disclosure.

FIG. 5 is a data flow diagram of interactions between the central and affiliate site systems during stored source originations in accordance with a representative embodiment of the present disclosure. The flow of the process for stored source originations begins in the affiliate site system (103). A request passes through communication links, such as a communication satellite (101), to the central site system (102) where the program content, commercial content, and/or their related event files are accessed, sequenced, and executed. The broadcast event data stream is forwarded through a communication channel, such as a communication satellite (101), to the affiliate site (103) for broadcast.

Stored program and commercial content is requested by the affiliate (103) with the input of a sequence of commands to the control browser (516), which are forwarded by the Internet client (515) through the communications network links (513) (514). The central server (512) forwards the request to the event sequence server (507), which accesses the appropriate commercial database record (503) or program database record (504) to assemble the broadcast event stream (508).

The compressed data stream containing stored program and commercial content is forwarded to the central server (512) for the insertion of the digital artifact. In a computer software process resident in the central server (512), the information that comprises the digital artifact is assembled. The event data (511) containing a unique event identification key and the destination instructions is drawn from the event log database (505) by the traffic server (506) and presented to the central server (512), a unique time stamp is drawn from the event clock (509) and is combined with the event data (511) and the central server's own source identifier are all combined to form the digital artifact. The digital artifact is imbedded steganographically by the central server (512) into the broadcast event stream. Each event in the broadcast event stream (508) presented to the communication link (513) through the central server (512) contains the identifying digital artifact. The information contained in the digital artifact changes continuously as the time stamp changes and/or as the unique event identifier changes to reflect changes with the event sequence content of the broadcast event stream.

The compressed data stream of stored program and commercial broadcast events is distributed to the affiliate site (103) by the central site communication link (513) through the Internet, a local area network, a wide area network, the public switched telephone network, a wireless network, fiber-optic network, other suitable communications media, or a suitable combination of such communications media. On the basis of command instructions from the affiliate control browser (516), the compressed data stream is routed by the Internet client (515) to the affiliate broadcast production server (517) to integrate into the broadcast event data stream.

The broadcast event sequence data stream containing the stored program and commercial content is passed to affiliate site's broadcast production server (517) for insertion into the affiliate's broadcast event sequence and the resulting affiliate broadcast event sequence is routed to the affiliate site's broadcast transmitter (519). At the broadcast transmitter (519), the affiliate broadcast event stream is passed through a digital-to-analog converter where the data stream is translated into a broadcast standard audio or audio/video signal. The signal including the digital artifact is then channeled through the broadcast transmitter's program feed signal processing where it is limited for dynamic amplitude, compressed for frequency response, and routed to the transmitter for broadcast electromagnetically in the radio frequency spectrum.

Figure 6:
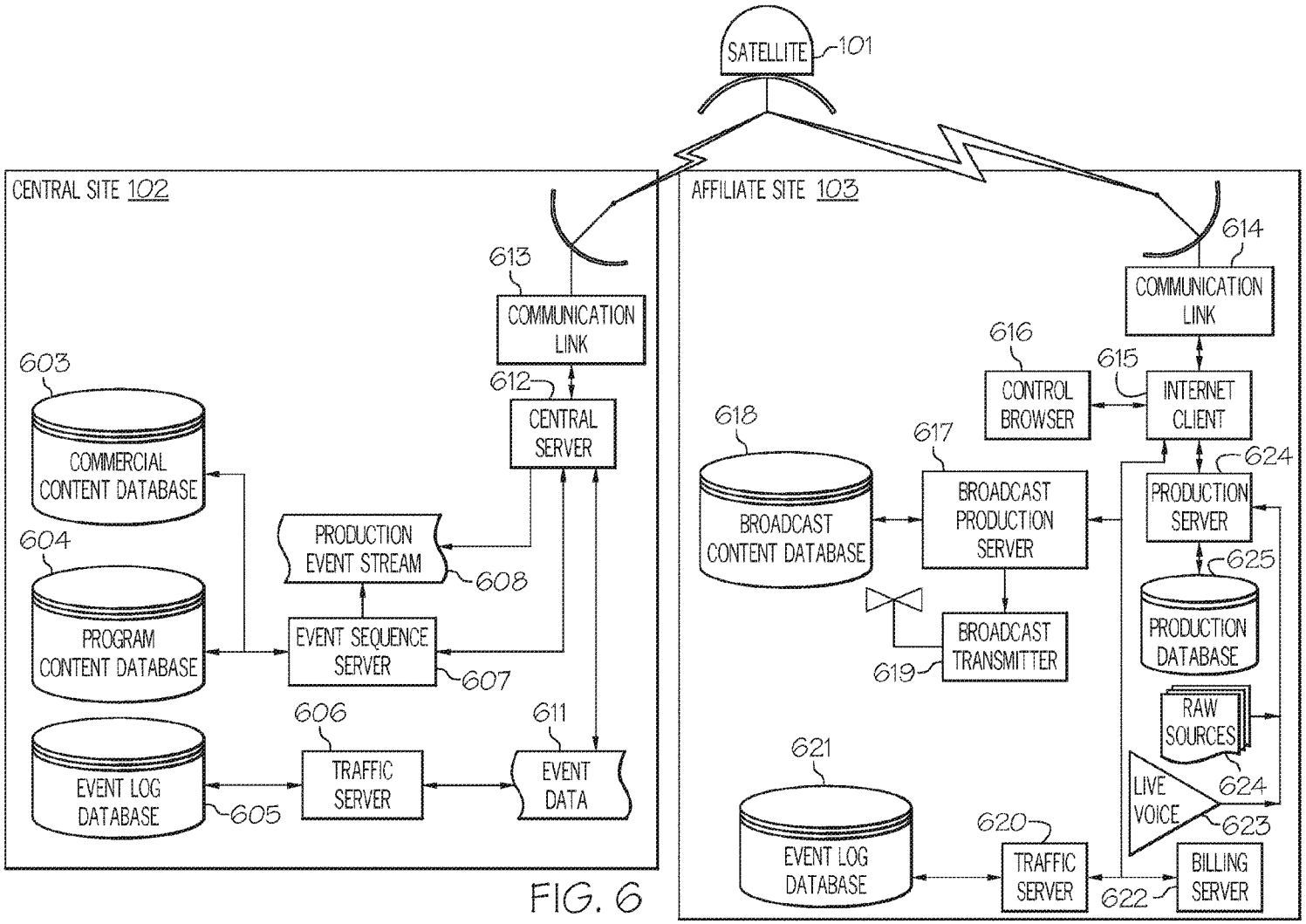
FIG. 6 is a data flow diagram of representative interactions between the central site system and the affiliate site systems during affiliate content originations in accordance with a representative embodiment of the present disclosure.

FIG. 6 is a data flow diagram of interactions between the central and affiliate site systems during affiliate site originations in accordance with a representative embodiment of the present disclosure. The flow of the process for affiliate originations begins in the affiliate site system (103). A request passes through communication links, such as a communication satellite (101), to the central site system (102) where the program, commercial, and event files are stored for either real-time or future access, sequencing, and execution.

The process of uploading program content and commercial content originated at the affiliate site begins with the affiliate site's control browser (616) issuing one or more commands through the Internet client (615). These commands are passed to the central site (102) through communication links (614) and (613). The central server (612) receives these instructions and instructs the special function servers, an event sequence server (607) to create data records in the program content database (604) to receive program content digital audio files, and/or to create data records in the commercial content database (603) to receive commercial content digital audio files, and the traffic server (606) to create data records in the event log database (605) to receive event instructions.

The special function servers transmit commands to the central server (612), which distributes the commands to the affiliate site (103) through the communication link (614) by the Internet, a local area network, a wide area network, the public switched telephone network, a wireless network, fiber-optic network, other suitable communications media, or a suitable combination of such communications media. The affiliate site Internet client (615) receives the commands and the control browser (616) instructs the production server (624) to upload the designated digital audio files from the production database (625).

Alternatively, the upload command acts as a cue for the manual uploading of program or commercial content from raw sources (624) that include, but are not limited to, compact disc (CD) players and player/recorders, digital audio tape (DAT) players and player/recorders, analog audio tape, cassette, or cartridge players or player/recorders, and electro-transcription disc players or the capture and conversion to digital audio content of real-time human vocal content.

Digital file upload commands originated by the event sequence server (607), received and translated by the affiliate command browser (616) through the Internet client (615) are executed by the production server (624).

Digital audio files that contain program content are read from the production database (625) by the production server (624) and presented to the Internet client (615) for transmission to the central site (102) through the affiliate communication link (614). The central server (612) receives the program content digital audio file from the communication link (613) and routes it to the event sequence server (607) for storage as an item of the previously created program content record in the program content database (604).

Digital audio files that contain commercial content are read from the production database (625) by the production server (624) and presented to the Internet client (615) for transmission to the central site (102) through the affiliate communication link (614). The central server (612) receives the program content digital audio file from the communication link (613) and routes it to the event sequence server (607) for storage as an item of the previously created commercial content record in the commercial content database (603).

The successful completion of this upload process initiates an upload success notification by the event sequence server (607) that is distributed to the affiliate site (103) by the central server (612) through the communication link (613). This upload success notification is received at the affiliate site (103) by the Internet client (615) through the communication link (614) and is routed to the affiliate site's traffic server (620). Upon receipt of the upload success notification, the affiliate site traffic server (620) accesses the affiliate site's event log database (621) and forwards all records related to the uploaded commercial and/or program content to the Internet client (615), which sends the commercial and/or program event data through the communication links (614) and (613) to the central server (612). The central server (612) routes the event data (611) to the traffic server (606) for insertion as items in the previously established event records of the central site event log database (605).

Figure 7:
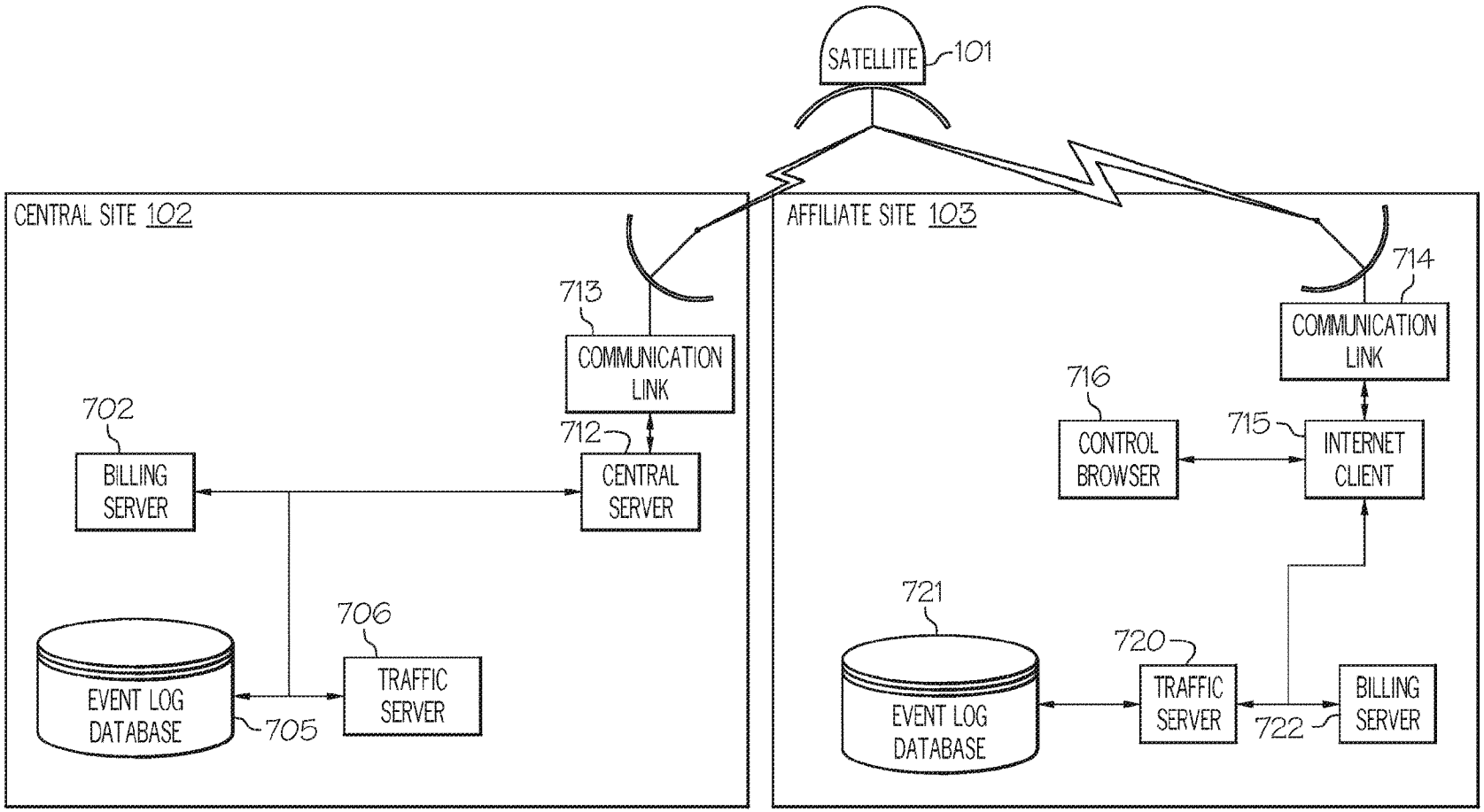
FIG. 7 is a data flow diagram of representative interactions between the central site and the affiliate site systems during the advertiser billing process in accordance with a representative embodiment of the present disclosure.

FIG. 7 is a data flow diagram of interactions between the central and affiliate site systems during the advertisement billing process in accordance with a representative embodiment of the present disclosure. The flow of the process for advertisement billing begins in the affiliate site system (103). It passes through communication links, such as satellite (101), to the central site system (102) where the event files are stored and the appropriate billing data is returned to the affiliate site special function servers for process execution.

Affiliate sites that operate with the assistance of a computerized billing system use the control browser (716) to order invoice production. As shown in FIG. 7, process begins with the affiliate site's control browser (716) issuing one or more commands through the Internet client (715). These commands are passed to the central site (102) through communication links (713) and (714). The central server (712) receives these instructions and routes them to the billing server (702). The billing server (702) accesses the traffic server (706) to obtain event log information from the event log database (705) on affiliate broadcast advertising within the parameters of the browser request.

The event data requested of the traffic system (706) is routed by the traffic server (706) to the billing server (702). The event data is formatted by the billing server (702) into an advertising affidavit and an advertiser invoice.

The advertising affidavit is a listing in date and time sequence of the specific advertisements broadcast, the advertisements length, and its unique commercial identifier. The advertiser invoice is formatted with appropriate designations to be identical to the advertisement invoices published by the affiliate organization. This invoice includes all information from the advertising insertion order and the specific itemization of the order's performance in order to secure payment.

The two documents are inserted in an ad invoice folder. This ad folder is returned from the central site's billing server (702) by the central server (712) through the communications links (713) and (714) to the affiliate site's Internet client (715). The Internet client (715) routes the folder to the affiliate billing server (722) for invoice production and collections tracking.

It will be appreciated by one of ordinary skill in the art that the methods described above may be carried out in software running on one or more processors (not shown), and that the software may be provided as a computer program element carried on any suitable data carrier (also not shown) such as a magnetic or optical computer disc. The channels for the transmission of data likewise may include storage media of all descriptions as well as signal carrying media, such as wired or wireless signal media.

Accordingly, the present disclosure may suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including, but not limited to, optical or analog communications lines, or intangibly using wireless techniques, including, but not limited to, microwave, infrared, or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

As will be appreciated, the processes in illustrated embodiments of the present disclosure may be implemented using any combination of computer programming software, firmware, or hardware. For example, an article of manufacture containing the computer programming code is used by either executing the code directly from the storage device, by copying the code from the storage device into another storage device such as a hard disk, RAM, etc., or by transmitting the code for remote execution. The method form of the disclosure may be practiced by combining software and/or hardware to complete the steps of the disclosure. An apparatus for practicing the disclosure could be one or more computers and storage systems containing or having network access to computer program(s) coded in accordance with the disclosure.

While the disclosure has been particularly shown and described with reference to representative embodiments, it will be understood by those skilled in the art that various changes in form and detail may be made therein without departing from the spirit and scope of the claimed subject matter. Any variations, modifications, and additions to the embodiments described are possible and may fall within the scope of the disclosure as detailed within the following claims.

What is claimed is:

1. A method comprising:

receiving, at a client computer remote from a central site server, a digital data stream in accordance with Internet Protocol and transmitted from the central site server, wherein the digital data stream comprises digitized broadcast content that comprises a sequence of entertainment and commercial events and two or more digital identifiers, wherein the two or more digital identifiers are generated, at the central site server, to reflect the sequence of entertainment and commercial events in the digital data stream, and each digital identifier identifies entertainment or commercial content of a matched event and includes:

a time stamp indicating a time that the digital identifier was generated by the central site server, destination instructions that identify the client computer, and identification of the central site server as the source of the digital identifier; and wherein each digital identifier is inserted into the digitized broadcast content after the entertainment and commercial events are put in the sequence; and in response to receiving the digital data stream at the client computer the client computer:

extracting the two or more digital identifiers from the digital data stream;

accessing an event data record at the central site server; and retrieving information about commercial content of the digital data stream from the event data record based on an association with at least one of the two or more digital identifiers extracted from the digital data stream.

2. The method of claim 1, further comprising, prior to said receiving the digital data stream by the client computer, transmitting a command through an Internet browser of an affiliate site to the central site server scheduling the sequence of entertainment and commercial events to be transmitted to the client computer.

3. The method of claim 1, further comprising, after said receiving the digital data stream by the client computer, transmitting an analog version of the digital data stream in a radio frequency spectrum by a broadcast transmitter coupled to the client computer.

4. The method of claim 1, further comprising, prior to said receiving the digital data stream by the client computer:

uploading entertainment or commercial content via the Internet by an affiliate site and storing the digital data stream in a storage device coupled to the central site server, and further accessing the digital data stream in the storage device by the central site server for subsequent broadcast transmissions, wherein the digital data stream includes the uploaded entertainment or commercial content;

uploading event data by the affiliate site about the entertainment or commercial content to the central server after receiving an upload success notification; and storing the event data in an event log database by the central site server.

5. The method of claim 1, further comprising storing, by the central site server, at least one of the digital identifiers and a date and a time of transmission of the digital data stream by the central site server in an event log database.

6. The method of claim 5, further comprising, after said receiving the digital data stream by the client computer, providing an invoice by the central site server for the transmission of the digital data stream, wherein the invoice includes at least one of the digital identifiers and the date and the time of the transmission from the central site stored in the event log database.

7. The method of claim 1, further comprising, prior to said receiving the digital data stream by the client computer, uploading an event sequence request by an affiliate site to the central site server indicating the sequence of entertainment and commercial events of the digital data stream.

8. A system comprising:

one or more data processing systems comprising:

a client computer, remote from a central site server, configured to receive a digital data stream in accordance with Internet Protocol and transmitted from the central site server, wherein the digital data stream comprises digitized broadcast content that includes a sequence of entertainment and commercial events and two or more digital identifiers generated by the central site server, wherein the two or more digital identifiers are generated, at the central site server, to reflect the sequence of entertainment and commercial events in the digital data stream, and each digital identifier identifies content of a matched event and includes:

a time stamp indicating a time that the digital identifier was generated by the central site server;

destination instructions that identify the client computer, and identification of the central site server as the source of the digital identifier; and wherein each digital identifier is inserted into the digitized broadcast content after the entertainment and commercial events are put in the sequence; and in response to receiving the digital data stream at the client computer the client computer is further configured to:

extract the two or more digital identifiers from the digital data stream;

access an event data record at the central site server; and retrieve information about commercial content of the digital data stream based on an association with at least one of the two or more digital identifiers extracted from the digital data stream.

9. The system of claim 8, wherein the client computer is further configured to transmit a command through an Internet browser to the central site server scheduling the sequence of entertainment and commercial events to be transmitted back to the client computer from the central site server.

10. The system of claim 8, further comprising:

a broadcast transmitter coupled to the client computer and configured to transmit an analog version of the received digital data stream in a radio frequency spectrum.

11. The system of claim 8, further comprising:

a storage device configured to store the entertainment or commercial content, wherein, prior to receiving the digital data stream, the client computer is further configured to:

upload the entertainment or commercial content via the Internet and further access the entertainment or commercial content in the storage device for subsequent broadcast transmission, wherein the digital data stream includes the uploaded entertainment or commercial content; and upload event data about the entertainment or commercial content to the central server for storage in a database after receiving an upload success notification.

12. The system of claim 8, further comprising:

a database configured to store the digital identifier and a date and a time of transmission of the digital data stream from the central site server to the client computer.

13. The system of claim 8, further comprising:

a computing device configured to provide an invoice for the transmission of the digital data stream after the digital data stream is received by the client computer, wherein the invoice includes at least one of the digital identifiers and the date and the time of the transmission of the digital data stream from the central server to the client computer stored in an event log database.

14. The system of claim 8, wherein the client computer is further configured to upload an event sequence request to the central site server, prior to receiving the digitized broadcast content of the digital data stream, wherein the event sequence request indicates the sequence of entertainment and commercial events of the digitized broadcast content of the digital data stream.

15. A non-transitory, computer-readable medium having computer-executable instructions stored thereon that, in response to execution by one or more computing devices, causes the one or more computing devices to:

receive, at a client computer remote from a central site server, a digital data stream in accordance with Internet Protocol and transmitted from the central site server, wherein the digital data stream comprises digitized broadcast content that includes a sequence of entertainment and commercial events and two or more digital identifiers, and wherein the two or more digital identifiers are generated, at the central site server, to reflect the sequence of entertainment and commercial events in the digital data stream, and each digital identifier identifies entertainment or commercial content of a matched event and includes:

a time stamp indicating a time that the digital identifier was generated by the central site server, destination instructions that identify the client computer, and identification of the central site server as the source of the digital identifier; and wherein each digital identifier is inserted into the digitized broadcast content after the entertainment and commercial events are put in the sequence; and in response to receiving the digital data stream at the client computer:

extract the two or more digital identifiers from the digital data stream;

access an event data record at the central site server; and retrieve information about commercial content of the digital data stream based on an association with at least one of the digital identifiers extracted from the digital data stream.

16. The non-transitory, computer-readable medium according to claim 15, wherein, prior to receiving the digital data stream, the instructions further cause the one or more computing devices to transmit a command through an Internet browser to the central site server scheduling the sequence of entertainment and commercial events to be transmitted back to an affiliate site.

17. The non-transitory, computer-readable medium according to claim 15, wherein the instructions further cause the one or more computing devices to provide an invoice for the transmission of the digital data stream, wherein the invoice includes at least one of the digital identifiers and a date and a time of the transmission of the digital data stream from the central server to the client computer stored in an event log database.

18. The non-transitory, computer-readable medium according to claim 15, wherein, after receiving the digital data stream by the client computer, the instructions further cause the one or more computing devices to transmit an analog version of the digital data stream in a radio frequency spectrum by a broadcast transmitter coupled to the client computer.

19. The non-transitory, computer-readable medium according to claim 15, wherein, prior to receiving the digital data stream by the client computer, the instructions further cause the one or more computing devices to:

upload entertainment or commercial content via the Internet to an affiliate site;

store the entertainment or commercial content in a storage device;

access the entertainment or commercial content in the storage device for subsequent broadcast transmission, wherein the digital data stream includes the uploaded entertainment or commercial content; and upload event data about the entertainment or commercial content to the central server for storage in a database after receiving an upload success notification.

20. The non-transitory, computer-readable medium according to claim 15, wherein the instructions further cause the one or more computing devices to store the two or more digital identifiers and a date and a time of transmission of the digital data stream by the central site server in a database coupled to the central site server.

*21. A method, comprising:*

*receiving, at a central site server remote from a client computer, a request from the client computer for a digital data stream that comprises digitized broadcast content that comprises a sequence of entertainment and commercial events;*

*generating, by the central site server, two or more digital identifiers to reflect the sequence of entertainment and commercial events in the digital data stream;*

*inserting, by the central site server, the two or more digital identifiers into the digitized broadcast content after putting the entertainment and commercial events in the sequence;*

*transmitting, by the central site server, the digital data stream to the client computer;*

*receiving, by the central site server from the client computer, a request to access an event data record using the two or more digital identifiers extracted by the client computer from the digital data stream; and*

*retrieving information about commercial content of the digital data stream from the event data record based on an association with at least one of the two or more digital identifiers extracted from the digital data stream;*

*wherein each digital identifier identifies entertainment or commercial content of a matched event and includes:*

*a time stamp indicating a time that the digital identifier was generated by the central site server,*

*destination instructions that identify the client computer, and*

*identification of the central site server as the source of the digital identifier.*

*22. The method of claim 21, further comprising receiving, by the central site server prior to transmitting the digital data stream, a command from the client computer via an Internet browser of an affiliate site scheduling the sequence of entertainment and commercial events to be transmitted to the client computer.*

*23. The method of claim 21, further comprising, prior to transmitting the digital data stream to the client computer:*

*storing, by the central site server, entertainment or commercial content uploaded via the internet by an affiliate site in a storage device coupled to the central site server;*

*further accessing the digital data stream in the storage device, by the central site server, for subsequent broadcast transmissions, wherein the digital data stream includes the uploaded entertainment or commercial content;*

*receiving, by the central site server, event data uploaded by the affiliate site about the entertainment or commercial content after receiving an upload success notification; and*

*storing, by the central site server, the event data in an event log database.*

*24. The method of claim 21, further comprising storing, by the central site server, at least one of the digital identifiers and a date and a time of transmission of the digital data stream by the central site server in an event log database.*

*25. The method of claim 24, further comprising providing, by the central site server after transmitting the digital data stream to the client computer, an invoice for the transmission of the digital data stream, wherein the invoice includes at least one of the digital identifiers and the date and the time of the transmission from the central site stored in the event log database.*

*26. The method of claim 21, further comprising receiving, from an affiliate site by the central site server prior to transmitting the digital data stream to the client computer, an event sequence request indicating the sequence of entertainment and commercial events of the digital data stream.*

* * * * *